United States Patent [19]

Campbell

[11] Patent Number: 4,635,975
[45] Date of Patent: Jan. 13, 1987

[54] QUICK-CONNECT TUBE COUPLING

[75] Inventor: Lawrence C. Campbell, Berea, Ohio

[73] Assignee: Jaco Manufacturing Company, Berea, Ohio

[21] Appl. No.: 780,076

[22] Filed: Sep. 25, 1985

[51] Int. Cl.⁴ ............................................. F16L 17/02
[52] U.S. Cl. ................................... 285/340; 285/354; 285/423
[58] Field of Search ................ 285/340, 353, 354, 423

[56] References Cited

U.S. PATENT DOCUMENTS

| | | | |
|---|---|---|---|
| 2,466,526 | 4/1949 | Wolfram | 285/354 X |
| 3,874,709 | 4/1975 | MacDonald | 285/340 X |
| 4,062,574 | 12/1977 | Scholin | 285/340 |
| 4,508,369 | 4/1985 | Mode | 285/340 X |

FOREIGN PATENT DOCUMENTS

| | | | |
|---|---|---|---|
| 5685 | 12/1979 | European Pat. Off. | 285/340 |
| 2368663 | 5/1978 | France | 285/340 |
| 1520150 | 8/1978 | United Kingdom | 285/340 |

Primary Examiner—Dave W. Arola
Attorney, Agent, or Firm—Renner, Otto, Boisselle & Lyon

[57] ABSTRACT

A quick-connect tube coupling includes a body member having a bore for receiving the end of a tube, a first counterbore adjacent the outer end of the body member for receipt of an annular ring portion of a gripper ring surrounding the tube, and a second smaller diameter counterbore between the bore and first counterbore for receipt of radially and axially inwardly extending gripper ring fingers. The second counterbore provides limited and controlled outward deflection of the gripper ring fingers when a pulling force is applied to the tube so that the fingers bite into the tube surface preventing the tube from being pulled out of the coupling. A hand-threaded nut on the outer end of the body member retains the gripper ring within the body member when a pulling force is applied to the tube. An O-ring seal is also desirably contained within the first counterbore axially outwardly of the gripper ring to form a seal between the tube and body member. A washer disposed between the O-ring seal and gripper ring provides an axially movable support therebetween. In one form of the invention, the gripper ring fingers are radially outwardly deformed from the outer corners of the fingers toward the center along the outer edge of the fingers so that the finger corners bite into the tube first when a pulling force is applied to the tube.

10 Claims, 6 Drawing Figures

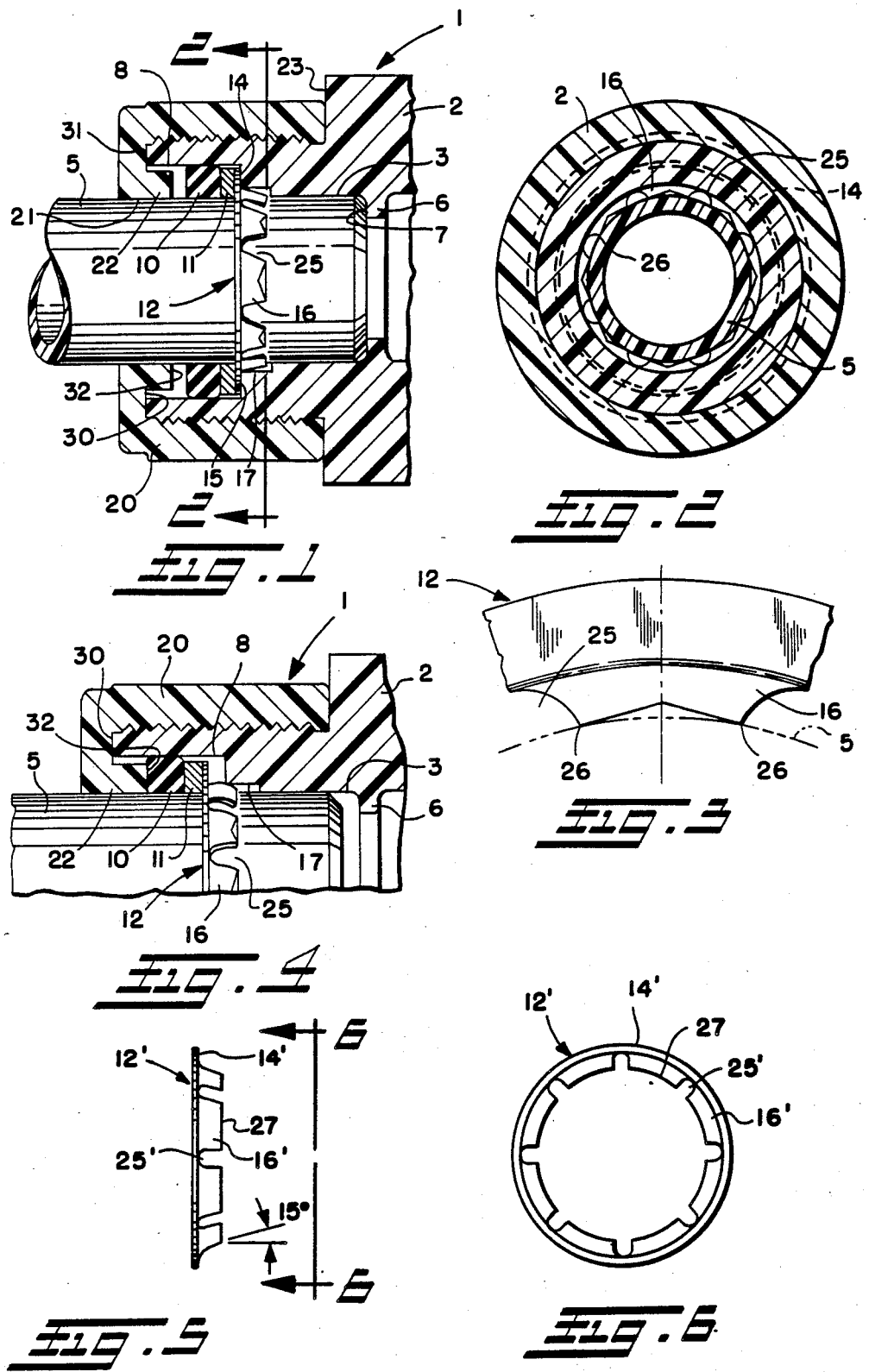

QUICK-CONNECT TUBE COUPLING

This invention relates generally as indicated to a quick-connect tube coupling and more particularly to a tube coupling which is designed to be fully assembled by hand before insertion of the tube. Also, the connection is made simply by hand inserting the tube into the coupling without any further tightening of the coupling being required.

In accordance with the present invention, the tube coupling includes a body member having a bore for receiving the end portion of a tube. Adjacent the outer end of the body member is a first counterbore containing an annular ring portion of a gripper ring. Between the bore and first counterbore is a second smaller diameter counterbore which receives radially and axially inwardly extending gripper ring fingers to provide for limited and controlled outward deflection of the gripper ring fingers when a pulling force is applied to a tube inserted therein so that the fingers bite into the outer surface of the tube preventing the tube from being pulled out of the coupling. A nut is threaded onto the outer end of the body member to retain the gripper ring within the body member and prevent axial outward movement of the gripper ring fingers beyond the outer end of the second counterbore.

Also in accordance with the invention, an O-ring seal is desirably inserted into the first counterbore axially outwardly of the gripper ring to form a seal between the tube and first counterbore.

Further in accordance with the invention, a washer is desirably inserted in the first counterbore between the O-ring seal and gripper ring to provide an axially movable support therebetween.

In accordance with another aspect of the invention, the nut has an inturned flange portion whose I.D. is substantially the same as the O.D. of the tube to provide additional support for the tube adjacent the outer end of the body member and limit the outward travel of the O-ring seal, washer and gripper ring within the first counterbore and the gripper ring fingers within the second counterbore.

In one form of the invention, the gripper ring fingers are desirably radially outwardly deformed from the outer corners thereof toward the center along the axial inner ends of the fingers so that the corners of the fingers bite into the tube first when a pulling force is applied to the tube.

To the accomplishment of the foregoing and related ends, the invention, then, comprises the features hereinafter fully described and particularly pointed out in the claims, the following description and the annexed drawings setting forth in detail a certain preferred embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section of a preferred form of tube coupling embodying the present invention and showing how the tube connection is made by inserting the tube into the coupling until the tube bottoms out at the tube stop after the tube coupling has been fully assembled by hand without the need for any tools;

FIG. 2 is a transverse section through the tube coupling of FIG. 1, taken along the plane of the line 2—2 thereof;

FIG. 3 is an enlarged end elevation view of one of the gripper ring fingers showing how the corners thereof bite into the exterior surface of the tube when a pulling force is applied to the tube;

FIG. 4 is a fragmentary longitudinal section of the tube coupling of FIG. 1 but showing the limited outward travel of the gripper ring and associated O-ring seal and back-up washer which occurs when a pulling force is applied to the tube;

FIG. 5 is a side elevation view of another form of gripper ring which may be used in place of the gripper ring shown in the tube coupling of FIGS. 1-3; and FIG. 6 is an end elevation view of the gripper ring of FIG. 5 substantially as seen from the plane of the line 6—6 thereof.

DETAILED DESCRIPTION OF A PREFERRED EMBODIMENT

Referring now in detail to the drawings and initially to FIG. 1, there is shown a preferred form of tube coupling 1 in accordance with the present invention including a body member 2 having a bore 3 for receiving the end portion of a tube 5. A tube stop 6 extends radially inwardly from the wall of the bore providing a shoulder 7 limiting inward movement of the tube into the body member. The I.D. of the bore is substantially the same as the O.D. of the tube for close sliding receipt of the tube within the bore.

At the outer end of the body member is a first counterbore 8 of a size and length to accommodate an O-ring seal 10, a radially flat washer 11 and gripper ring 12 surrounding the tube 5 when the tube is inserted into the bore as described hereafter. The gripper ring 12 is made of spring steel and is inserted first into the counterbore 8. As shown, the gripper ring includes an radially flat annular outer ring portion 14 engageable with a radially flat shoulder 15 at the axial inner end of the counterbore 8 and a plurality of circumferentially spaced gripper ring fingers 16 which extend axially and radially inwardly from the I.D. of the ring portion 14 axially inwardly beyond the axial innermost surface of the outer ring portion into a second smaller diameter counterbore 17 between the first counterbore 8 and bore 3.

The gripper ring portion 14 has an O.D. somewhat less than the I.D. of the first counterbore 8 and an I.D. somewhat greater than the O.D. of the tube 5. Likewise, the axial outer ends of the gripper fingers 16, which are integral with the annular ring portion, have an I.D. somewhat greater than the O.D. of the tube. The axial inner ends of the gripper ring fingers, on the other hand, have an I.D. somewhat smaller than the O.D. of the tube when the fingers are in the unstressed condition before insertion of the tube into the tube coupling. Accordingly, when the connection is made by inserting the tube into the tube coupling, the axial inner ends of the gripper fingers 16 will grip the exterior of the tube to prevent withdrawal of the tube from the coupling as described hereafter.

The O.D. and I.D. of the O-ring seal 10 are respectively slightly greater and less than the respective I.D. and O.D. of the first counterbore 8 and tube 5 to provide a fluid-tight seal therebetween when the connection has been made, whereas the washer 11 has an O.D. approximating the O.D. of the annular ring portion 14 of the gripper ring 12 and an I.D. approximating the O.D. of the tube to provide an axially movable support between the gripper ring and O-ring seal when a pulling force is applied to the tube tending to pull the tube out of the coupling.

To maintain the gripper ring, washer and O-ring seal in assembled relation within the body member 2, a nut member 20 is threaded onto the outer end of the body member. The nut member has a longitudinal opening 21 whose I.D. approximates the O.D. of the tube. The wall of the opening 21 is desirably formed by an axially inwardly extending flange portion 22 which extends part way into the first counterbore 8 to provide additional support for the tube at the outer end of the body member and reduce the amount of permissible travel of the O-ring seal, washer and gripper ring within the first counterbore and the gripper ring fingers within the second counterbore when a pulling force is applied to the tube.

As evident from FIGS. 1-4, the gripper ring fingers 16 are formed by providing a plurality of circumferentially spaced notches 25 about the I.D. of an annular ring of spring steel and then bending the remaining metal between the notches at an angle to form the fingers. Then the fingers are desirably slightly radially outwardly deformed from the outer corners 26 toward the center along the arcuate cutting edges at the axial inner ends of the fingers so that the corners of the gripping fingers bite into the exterior of the tube first. Actual tests have shown that with the gripper ring design illustrated in FIGS. 1-4 wherein the axial inner ends of the gripper ring fingers 16 are formed in the tri-ac shape previously described, the more force that is applied in trying to pull the tube out of the coupling, the more the gripping fingers bite into the tube, to the point where the gripper ring will actually turn itself inside out before the gripper ring fingers will let go from the tube.

Alternatively, the gripper ring fingers 16' of the gripper ring 12' shown in FIGS. 5 and 6 may simply be bent at the desired angle after the notching operating to form arcuate cutting edges 27 along the entire width of the gripper ring fingers at the axial inner ends thereof. In that case the entire width of the gripper ring fingers will bite into the O.D. of the tube when a pulling force is applied thereto. However, in actual practice, such a gripper ring finger design has been found not to be as effective in gripping the tube as the gripper ring fingers 16 previously described, since the gripper ring fingers 16' will bite into the tube to a point and then skive off the tube as the pulling force increases above a certain level.

In either case, the second counterbore 17 must be provided around the gripper ring fingers 16 or 16' to provide for limited and controlled deflection of the gripper ring fingers when a pulling force is applied to the tube.

Before the tube is inserted into the tube coupling, the tube coupling is completely assembled by inserting the gripper ring 12, washer 11 and O-ring seal 10 into the first counterbore 8 and threading the nut 20 onto the body member 2 and fully tightening the nut member by hand without the need for any tools. Thereafter, the tube connection can be made at any time simply by inserting the tube through the nut 20 past the O-ring seal, washer and gripper ring until the tube bottoms out against the tube stop 6. A chamfer is desirably provided on the inner end of the tube to aid in its insertion into the tube coupling. When thus assembled, the tube cannot be removed from the coupling without completely unscrewing the nut from the body member and taking the tube coupling apart, which can still be done by hand.

To connect two tubes together, the same type of tube coupling as previously described may be provided at both ends of the body member, with a single tube stop 6 intermediate the ends of bores 3 extending into both ends of the body member.

Although the dimensions of the various parts of the tube coupling will vary depending on the particular application, one such tube coupling which has been found to be particularly suitable for use with ⅝ inch diameter tube includes a body member 2 having a 0.630 inch diameter bore 3 for receipt of the tube; a tube stop 6 having a 0.5 inch I.D. opening therethrough to provide a stop shoulder 7 having a radius of approximately 0.65 inch; a first counterbore 8 at the outer end of the body member having an I.D. of 0.850 inch; and a second counterbore 17 between the bore 3 and first counterbore 8 having an I.D. of 0.680 inch. The bore 3 itself may have an axial length of approximately 0.37 inch, whereas the first counterbore 8 may have an axial length of approximately 0.34 inch and the second counterbore 17 an axial length of approximately 0.10 inch.

The gripper ring 12 or 12' is made from spring steel having a thickness of approximately 0.010 inch. Also, the ring portion 14 or 14' has an O.D. of approximately 0.812 inch and an I.D. of approximately 0.670 inch leaving a radial dimension of approximately 0.071 inch. The gripper fingers 16 or 16' extend radially and axially inwardly at an angle of approximately 15° from the I.D. of the ring portion as shown in FIG. 5 and have an axial length of approximately 0.105 inch. The I.D. of the gripper ring fingers at the axial inner ends thereof in the unstressed condition prior to inserting the tube into the coupling is approximately 0.618 inch. Also, there are preferably eight such gripping ring fingers uniformly spaced around the inner periphery of the ring portion separated by the notches 25 or 25'. Moreover, each of the gripper ring fingers 16 as shown in FIGS. 1-4 is desirably uniformly deformed radially outward toward the center along the outer ends of the fingers a maximum distance of approximately 0.016 inch at the center so that the corners of the gripper ring fingers will grip the tube first.

The washesr 11 is radially flat and is desirably made out of a suitable plastic and has a ⅝ inch I.D. to match the O.D. of the tube, an O.D. of approximately 13/16 inch, and a thickness of approximately 1/16 inch. Also, the O-ring seal has an I.D. of approximately ⅝ inch, an O.D. of approximately 0.850 inch and a thickness of approximately ⅛ inch.

The nut 20, like the washer 11 and body member 2, is desirably made out of a suitable plastic, and has an I.D. of approximately 0.630 inch for close sliding receipt of the tube therethrough. Also, the inturned flange portion 22 of the nut has an O.D. of approximately 0.8 inch and an axial length extending axially inwardly beyond the radial inner end face 30 of the nut of approximately 0.1 inch. Accordingly, when the nut 20 is fully threaded onto the body member 2 with the inner end face 30 in engagement with the outer radial end wall 31 of the body member, a slight clearance of between 0.043 inch and 0.047 inch remains between the inner end face 32 of the inturned flange portion and the adjacent surface of the O-ring seal when the O-ring seal, washer and gripper ring are in their extreme rightmost positions shown in FIG. 1. This will permit limited travel of the O-ring seal, washer and gripper ring to the left within the first counterbore 8 while still providing sufficient overlap between the gripper ring fingers 16 or 16' and the I.D. of the second counterbore 17 to obtain the desired limited and controlled outward deflection of the gripper ring fingers 16 or 16' within the second counterbore 17 so that the fingers will bite into the tube to prevent withdrawal of the tube from the coupling when a pulling force is applied to the tube 5 as shown in FIG. 4.

From the foregoing, it will be apparent that the tube coupling of the present invention provides a very simple and effective means for making a quick connection with a tube without any tools being involved.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A tube coupling comprising a body member having a bore for receiving the end of a tube, a first counterbore adjacent the outer end of said body member having a diameter greater than the diameter of said bore, a second counterbore between said bore and first counterbore having a diameter greater than said bore and less than said first counterbore, a gripper ring contained within said body member, said gripper ring including an annular substantially radially flat outer ring portion received in said first counterbore, said outer ring portion having an inner diameter greater than the outer diameter of the tube and an outer diameter greater than the diameter of said second counterbore and less than the diameter of said first counterbore, and a plurality of gripper ring fingers at the inner diameter of said outer ring portion, said gripper ring fingers extending radially and axially inwardly beyond the axial innermost surface of said outer ring portion into said second counterbore, said gripper ring fingers having axial inner ends which when in an unstressed condition have an inner diameter which is less than the outer diameter of the tube to be inserted therein, and retaining means for retaining said gripper ring in said body member with said gripper ring fingers extending at least part way into said second counterbore, whereby when the tube is inserted into the bore past said gripper ring fingers and a pulling force is applied to the tube, said gripper ring fingers will bite into the tube preventing withdrawal of the tube from said tube coupling, the axial inner ends of said gripper ring fingers having arcuate cutting edges, with corners at the ends of the arcuate length of each of said arcuate cutting edges, said arcuate cutting edges being deformed radially outwardly from said corners toward the center of each of said arcuate cutting edges whereby said corners will bite into the tube first when the tube is inserted into the bore past the gripper ring fingers and a pulling force is applied to the tube.

2. The tube coupling of claim 1 wherein said body member has a substantially radially flat shoulder at the axial inner end of said first counterbore, said outer ring portion of said gripper ring radially overlaps said shoulder to limit the permissible axial inward movement of said gripper ring within said body member, and said second counterbore has a diameter substantially equal to the inner diameter of said outer ring portion to maximize the radial overlap between said shoulder at the axial inner end of said first counterbore and said gripper ring while still providing sufficient radial clearance between said second counterbore and said gripper ring fingers when in the unstressed condition to permit limited and controlled deflection of said gripper ring fingers into biting engagement with the tube when the tube is inserted into the bore past the gripper ring fingers and a pulling force is applied to the tube as aforesaid.

3. The tube coupling of claim 1 further comprising stop means within said body member limiting inward movement of the tube in said bore.

4. The tube coupling of claim 1 wherein said retainer means comprises a nut threaded onto the outer end of said body member, said nut having an axially inwardly extending flange portion which extends part way into said first counterbore to provide additional support for the tube at the outer end of said body member and limit the amount of permissible travel of said gripper ring within said body member.

5. The tube coupling of claim 4 wherein there is a substantially radially flat shoulder at the axial inner end of said first counterbore, and said annular substantially radially flat outer ring portion of said gripper ring radially overlaps said shoulder to limit the permissible axial inward movement of said gripper ring within said body member, and also radially overlaps said flange portion on said nut to limit the permissible axial outward movement of said gripper ring within said body member.

6. The tube coupling of claim 5 further comprising an O-ring seal within said first counterbore between said annular outer ring portion of said gripper ring and said flange portion of said nut.

7. The tube coupling of claim 6 further comprising a washer within said first counterbore between said annular outer ring portion of said gripper ring and said O-ring seal.

8. The tube coupling of claim 7 wherein said washer is substantially radially flat and radially overlaps a substantial portion of said annular substantially radially flat outer ring portion of said gripper ring and said O-ring seal to provide an axially movable support therebetween surrounding the tube when the tube is inserted into said bore past said O-ring seal, washer, and gripper ring.

9. The tube coupling comprising a body member having a bore for receiving the end of a tube, a first counterbore adjacent the outer end of said body member having a diameter greater than the diameter of said bore, a second counterbore between said bore and first counterbore having a diameter greater than said bore and less than said first counterbore, a gripper ring contained within said body member, said gripper ring including an annular ring portion received in said first counterbore, said ring portion having an inner diameter greater than the outer diameter of the tube, and a plurality of gripper ring fingers extending radially and axially inwardly from the inner diameter of said ring portion into said second counterbore, the axial inner ends of said gripper ring fingers when in an unstressed condition having an inner diameter which is less than the outer diameter of the tube to be inserted therein, and retaining means for retaining said gripper ring in said body member with said gripper ring fingers extending at least part way into said second counterbore, whereby when the tube is inserted into the bore past said gripper ring fingers and a pulling force is applied to the tube, said gripper ring fingers will bite into the tube preventing withdrawal of the tube from said tube coupling, the axial inner ends of said gripper ring fingers having arcuate cutting edges, with corners at the ends of the arcuate length of each of said arcuate cutting edges, said arcuate cutting edges being deformed radially outwardly from said corners toward the center of each of said arcuate cutting edges whereby said corners will bite into the tube first when the tube is inserted into the bore past the gripper ring fingers and a pulling force is applied to the tube.

10. A tube coupling comprising a body member having a bore for receiving the end of a tube, a first counterbore adjacent the outer end of said body member having a diameter greater than the diameter of said bore, a second counterbore between said bore and first counterbore having a diameter greater than said bore and less than said first counterbore, a gripper ring having an annular ring portion received in said first counterbore and a plurality of gripper ring fingers extending radially and axially inwardly from said ring portion into said second counterbore, an O-ring seal within said first counterbore axially outwardly of said ring portion of said gripper ring, and a washer within said first counterbore between said annular ring portion and said O-ring seal, and a nut threaded onto the outer end of said body member for retaining said O-ring seal, washer and annular ring portion of said gripper ring within said first counterbore and said gripper ring fingers within said second counterbore, stop means within said body member limiting inward movement of the tube in said bore, said nut having an axially inwardly extending flange portion which extends part way into said first counterbore to provide additional support for the tube at the outer end of said body member and limit the amount of permissible travel of said O-ring seal, washer and gripper ring toward the outer end of said body member, a shoulder at the axial inner end of said first counterbore limiting the amount of permissible axial inward travel of said O-ring seal, washer and gripper ring within said body member, the axial inner ends of said gripper ring fingers having arcuate cutting edges, with corners at the ends of the arcuate length of each of said arcuate cutting edges, said arcuate cutting edges being deformed radially outwardly from said corners toward the center of each of said arcuate cutting edges whereby said corners will bite into the tube first when the tube is inserted into the bore past the gripper ring fingers and a pulling force is applied to the tube.

* * * * *